United States Patent [19]
Johnson

[11] 3,990,638
[45] Nov. 9, 1976

[54] RADIATION SUPPRESSION

[75] Inventor: Douglas Johnson, Indianapolis, Ind.

[73] Assignee: General Motors Corporation, Detroit, Mich.

[22] Filed: June 8, 1970

[21] Appl. No.: 44,342

[52] U.S. Cl. ............................ 239/265.11; 60/271
[51] Int. Cl.[2] ........................................ B63H 11/00
[58] Field of Search ................ 239/265.11, 265.19; 60/271

[56] References Cited
UNITED STATES PATENTS

| | | | |
|---|---|---|---|
| 2,940,252 | 6/1960 | Reinhart | 239/265.17 |
| 3,084,505 | 4/1963 | Cherchi | 239/265.11 |
| 3,210,934 | 10/1965 | Smale | 60/265 |

*Primary Examiner* — Samuel Feinberg
*Attorney, Agent, or Firm* — Paul Fitzpatrick

[57] ABSTRACT

The exhaust duct of a turbojet engine, which is annular with an enlarged plug or bullet at the exhaust end, includes an arrangement of the outer wall to block direct sight of the turbine of the engine through the exhaust duct. There are two rows of inwardly directed streamlined lobes on the outer wall of the exhaust duct with the lobes of one row staggered with respect to those of the other so that the two sets cooperate to block direct view of the turbine through the gap between the plug and the outer wall of the exhaust duct.

3 Claims, 7 Drawing Figures

INVENTOR.
Douglas Johnson
BY
Paul Fitzpatrick
ATTORNEY

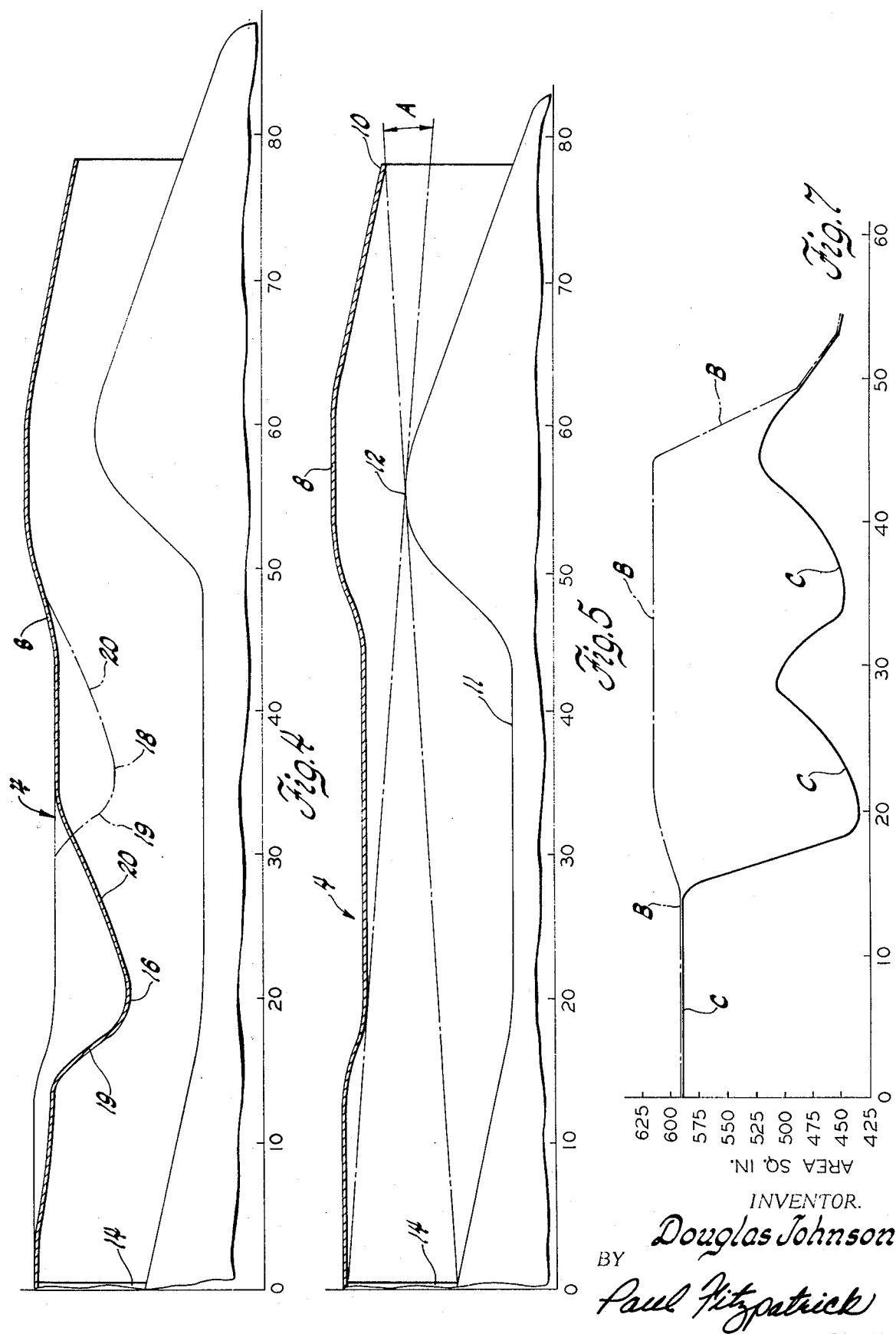

RADIATION SUPPRESSION

The invention herein described was made in the course of work under a contract or subcontract thereunder with the Department of Defense.

DESCRIPTION

My invention is directed to minimizing radiation from hot parts of an engine through an exhaust duct supplied by the engine; more particularly, to minimizing infrared radiation from a turbine of a gas turbine engine such, for example, as a turbojet aircraft engine. It will be apparent, however, that the principles of the invention are applicable to other situations upon consideration of the succeeding disclosure.

It has been recognized that it is highly desirable under some circumstances to minimize radiation such as infrared radiation from the hot parts of an engine through an exhaust duct. U.S. Pat. No. 3,210,934 of C. H. Smale granted Oct. 12, 1965 discloses and claims a radiation minimizing exhaust duct structure for a gas turbine engine.

My invention is directed to a simple and effective structure for this purpose and one particularly adapted to use in an engine having a plug type jet nozzle.

The principal object of my invention is to provide simple, effective structures to block radiation through an exhaust duct which does not significantly decrease engine efficiency.

The nature of my invention and its advantages will be apparent to those skilled in the art from the succeeding detailed description of the preferred embodiment of the invention.

Referring to the drawings,

FIG. 4 is an enlarged longitudinal sectional view of the nozzle of FIG. 1.

FIG. 5 is a diagram illustrating the exposure of the turbine to view from without the engine when the exhaust duct is not provided with the radiation minimizing structures of my invention.

FIG. 7 is a graphical showing of the effect of the invention on the area of the exhaust duct.

Figure 1:
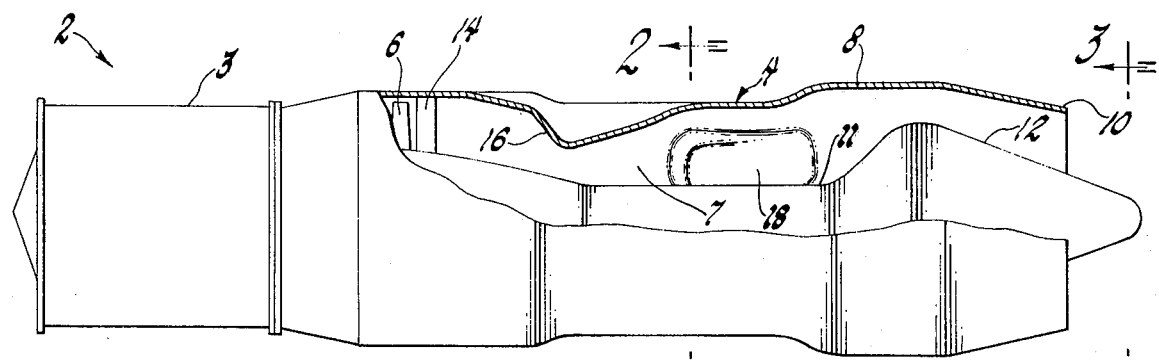
FIG. 1 is a view, with parts cut away and in section of an exhaust duct arrangement, shown with a jet engine illustrated schematically.

Referring first to FIG. 1, a turbojet engine 2 includes a gas turbine engine 3 and an exhaust system 4 into which the gas turbine discharges. The gas turbine engine may include the usual compressor or compressors which discharge through combustion apparatus in which fuel is burned to generate a motive fluid, which motive fluid energizes a turbine or turbines which drive the compressor or compressors. This conventional structure is not illustrated except for the last stage blades 6 of the turbine from which the motive fluid exhausts into the exhaust system 4. The structure of the gas turbine engine or gas generator is immaterial to my invention.

The exhaust system 4 defines a generally annular exhaust duct 7 between an outer wall 8 which terminates in a circular converging outlet 10 and an inner wall 11 which extends from immediately adjacent the turbine to a plug or bullet 12 which defines the engine exhaust nozzle in cooperation with the outer wall 8. Ordinarily, the plug 12 is provided with means by which it may be shifted axially so as to vary the area of the nozzle in response to various engine operating conditions. The inner wall may be supported from the outer wall by a ring of radially extending struts 14. The details of such exhaust systems are known and will not be further described.

Figure 6:
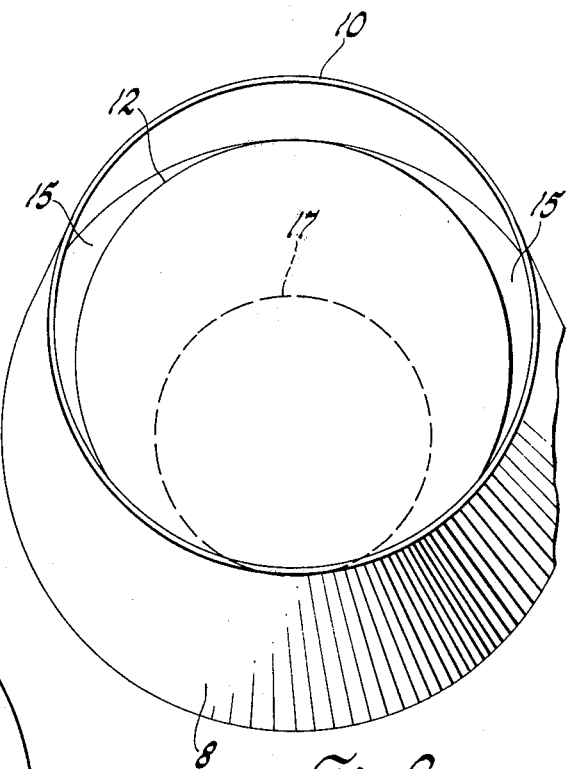
FIG. 6 is an oblique view of the exhaust end of the same illustrating the area through which the turbine may radiate.

The exhaust system of the Smale patent is somewhat similar to that described above. However, in that structure, the inner nozzle member is large enough to block direct view from the nozzle outlet to the turbine. Such a configuration is not always most suitable for a particular installation. In a nozzle according to my invention the plug used is of smaller diameter than the nozzle outlet and, as shown most clearly in FIG. 5, the struts 14 and turbine 6 would be visible through the rear end of the exhaust duct through an angle indicated as "A". The numerical scale in FIG. 5 represents distance from a datum point at the front end of the exhaust system 4. Referring to FIG. 6, which is a slightly off center view of the exhaust end of the engine lacking my invention, it will be seen that, notwithstanding the presence of the bullet 12, there are two windows 15 through which the turbine may be viewed from externally of the engine. The broken line circle 17 in this figure represents the turbine hub.

Figure 2:
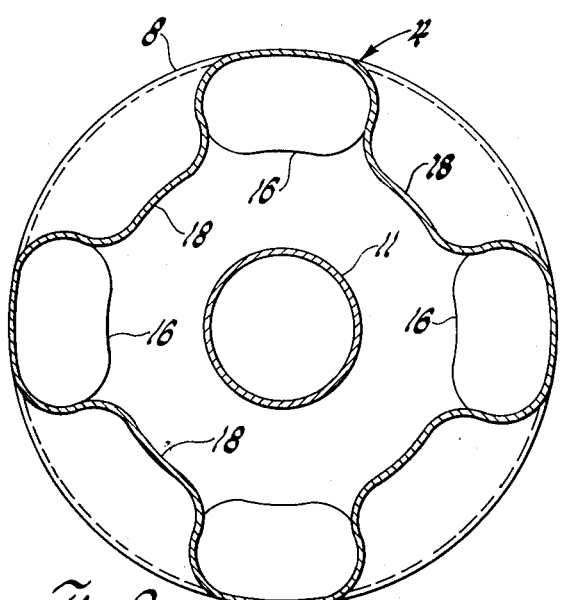
FIG. 2 is an enlarged cross sectional view of the exhaust duct taken on the plane indicated by the line 2—2 in FIG. 1.

This direct vision of the turbine from externally of the exhaust system is blocked off according to my invention by modification of the outer duct wall to provide a first row of bulges or lobes 16 and a second row of bulges or lobes 18 downstream of the first row. The preferred form of these bulges is of a generally streamlined nature to minimize any disturbance of flow in the exhaust duct which would tend to create turbulence. In the preferred form of the invention, each bulge extends through approximately 45° around the exhaust duct axis and has a generally hat shaped cross section as shown in FIG. 2, merging or blending smoothly with the unmodified full radius portion of the duct wall 8. As shown more clearly in FIG. 4, each bulge has an inwardly converging upstream surface 19 and a diverging downstream surface 20. The downstream surface has a less steep slope than the upstream surface. This minimizes disturbance of flow and provides for smooth diffusion of the flow after passing through or past the bulges 16 or 18. The bulges are shown as integral parts of the outer wall 8, but of course could be attachments mounted on the inside of the wall.

Figure 3:
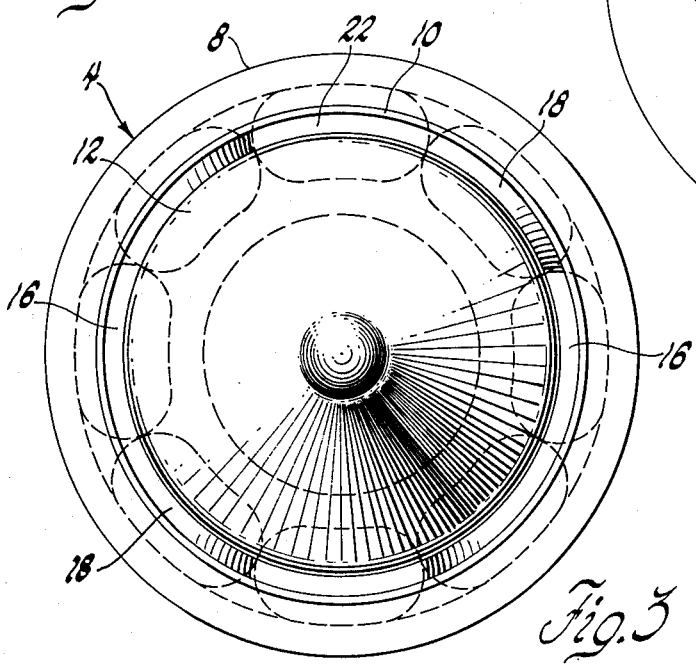
FIG. 3 is an elevation view of the duct, viewed from the exhaust end, as indicated by the line 3—3 in FIG. 1.

Referring to FIG. 3, it will be seen that there is a direct line of sight gap at 22 between the outlet 10 of the outer wall and the bullet 12 of the inner wall but that the bulges 16 and 18 effectively block view through the duct. This is accomplished with a minimum of interference to the gas flow through the duct. This is illustrated to some extent by FIG. 7, which is a plot of duct area against length using the same axial scale as in FIGS. 4 and 5. In this figure the line "B" is a graph of area of the duct with the generally cylindrical wall as shown in FIG. 5 without the bulges and the line "C" illustrates the area with the modified configuration of the invention. As will be apparent, the maximum reduction in area of the duct is approximately thirty percent, and with the smoothly converging and diverging wall structure, there is a minimum of loss of energy in the flowing gas. It will be appreciated that in this structure, with the staggered bulges and with the bulges of each set accomplishing only a part of the masking of the turbine, the reduction of area of the duct is a great deal less than would be the result of a necking in or convergence extending entirely around one axial plane of the duct.

It may be desirable to mention the fact that thermal radiation from the structures of the exhaust duct may be reduced by cooling such structures. Since various arrangements for cooling exhaust ducts of jet engines for this purpose or to increase the strength and resistance to erosion of the metal are known, it is not deemed necessary to include a disclosure of cooled walls or other structures in this application. Exhaust duct cooling arrangements are shown, for example, by the Smale patent referred to above. Particularly, it is desirable to cool the downstream of bulges 16 and 18 in this case.

The detailed description of preferred embodiments of the invention for the purpose of explaining the principles thereof is not to be considered as limiting or restricting the invention, as many modifications may be made by the exercise of skill in the art.

I claim:
1. An exhaust arrangement for a gas turbine engine including a turbine discharging into an exhaust duct leading to atmosphere, the arrangement comprising, in combination, an annular outer wall extending from the turbine to an atmospheric outlet and an annular inner wall substantially concentric with the outer wall and terminating in a nozzle plug at the outlet, the plug being a radial enlargement of the inner wall, the outer wall bearing means for inhibiting direct sight of the turbine through the outlet between the outer wall and plug comprising first and second axially spaced circumferentially extending rows of streamlined bulges extending inwardly, with the bulges in the second row circumferentially staggered with respect to those in the first row.

2. An exhaust system for a turbojet engine comprising an outer wall and an inner wall together defining an annular duct, the duct having an inlet end adapted to connect to the engine and an outlet end discharging to atmosphere, the inner wall bulging radially outwardly adjacent the outlet end to define a discharge nozzle with the outer wall, and means for inhibiting direct radiation from end to end of the duct comprising a first ring of bulges extending inward from the outer wall blocking direct viewing through alternate sectors of the duct and a second ring of bulges extending inward from the outer wall spaced axially from the first ring and blocking direct viewing through the remaining sectors of the duct.

3. A system as defined in claim 2 in which the bulges are of rounded outline with relatively steeply converging leading portions and relatively gently diverging trailing portions.

* * * * *